United States Patent [19]

Headley

[11] Patent Number: 5,678,856

[45] Date of Patent: Oct. 21, 1997

[54] EXPLODING FOIL INITIATOR FOR AIR BAG INFLATOR

[75] Inventor: Paul S. Headley, Mesa, Ariz.

[73] Assignee: TRW Inc., Lyndhurst, Ohio

[21] Appl. No.: 495,853

[22] Filed: Jun. 28, 1995

[51] Int. Cl.⁶ ................................. B60R 21/26
[52] U.S. Cl. ............ 280/737; 137/68.13; 222/3; 102/202.7
[58] Field of Search ............ 280/737, 736, 280/740, 741, 742; 137/68.13, 68.19, 68.3; 102/202.7, 202.5, 530, 531; 222/3, 5

[56] References Cited

U.S. PATENT DOCUMENTS

| | | | |
|---|---|---|---|
| 2,417,082 | 3/1947 | Mapes et al. | 137/68.13 |
| 3,642,304 | 2/1972 | Johnson et al. | 280/737 |
| 3,974,424 | 8/1976 | Lee | 102/202.5 |
| 4,006,919 | 2/1977 | Neuman | 280/736 |
| 4,114,924 | 9/1978 | Kasagi et al. | 280/740 |
| 4,928,595 | 5/1990 | Weingart | 102/202.7 |
| 5,022,674 | 6/1991 | Frantom et al. | 280/737 |
| 5,080,016 | 1/1992 | Osher | 102/202.7 |
| 5,088,413 | 2/1992 | Huber et al. | 102/202.5 |
| 5,115,743 | 5/1992 | Löffler | 102/202.7 |
| 5,131,680 | 7/1992 | Coultas et al. | 280/737 |
| 5,275,106 | 1/1994 | Cutting et al. | 102/202.7 |
| 5,291,828 | 3/1994 | Nerheim et al. | 102/202.7 |
| 5,344,186 | 9/1994 | Bergerson et al. | 280/737 |
| 5,370,053 | 12/1994 | Williams et al. | 102/202.5 |
| 5,370,054 | 12/1994 | Reams et al. | 102/202.5 |
| 5,385,097 | 1/1995 | Hruska et al. | 102/202.5 |

OTHER PUBLICATIONS

Stroud, John R., "A New Kind of Detonator–The Slapper", UCRL–77639, Feb., 1976.
Science and Technology article entitled "The Electric Gun: a Versatile Tool for Studying Explosive Initiation", publication date and author unknown.
RISI article entitled "Technical Discussion Exploding Foil Initiator (EFI)", publication date and author unknown.

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An apparatus for protecting a vehicle occupant comprises an Air bag having a stored deflated condition and an inflated condition for protecting a vehicle occupant. The apparatus also comprises an actuatable inflator (20, 320) for, when actuated, directing inflation fluid into the air bag. An energizable initiator (28, 228, 328) actuates the inflator (20, 320) upon energization. The initiator (28, 228, 328) comprises a foil, bridge section (126) and a flyer section (142). The foil bridge section (126) heats and explodes, in response to energization of the initiator (28, 228, 328), to propel the flyer section (142) to actuate the inflator (20, 320).

5 Claims, 5 Drawing Sheets

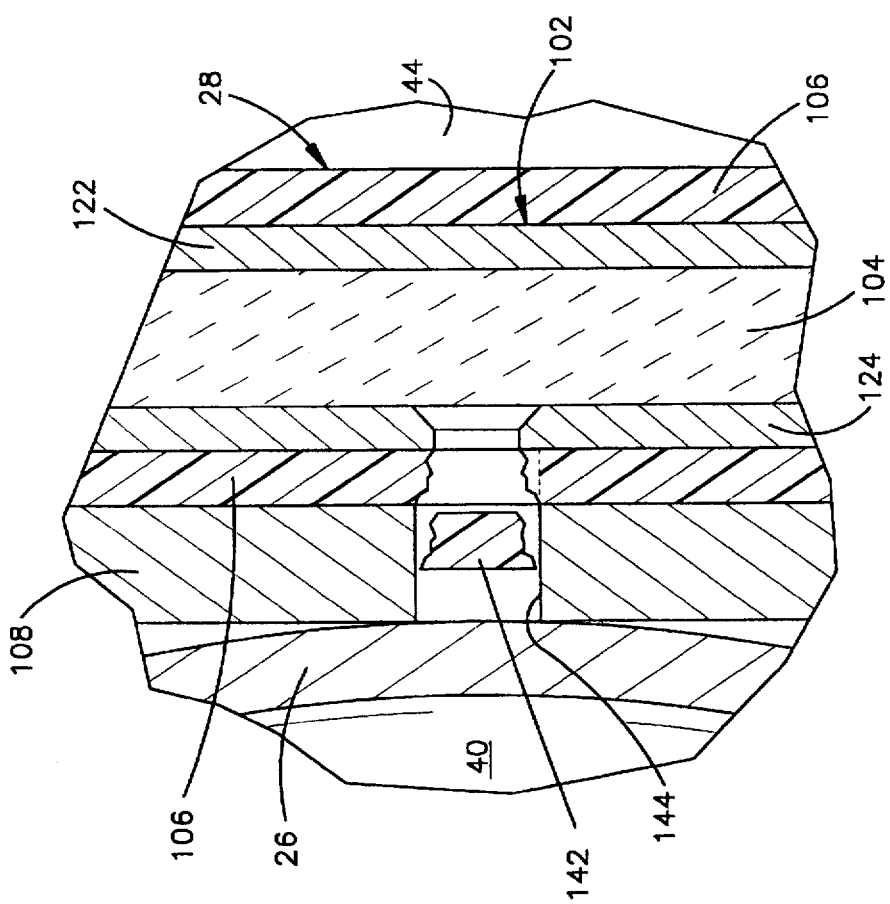
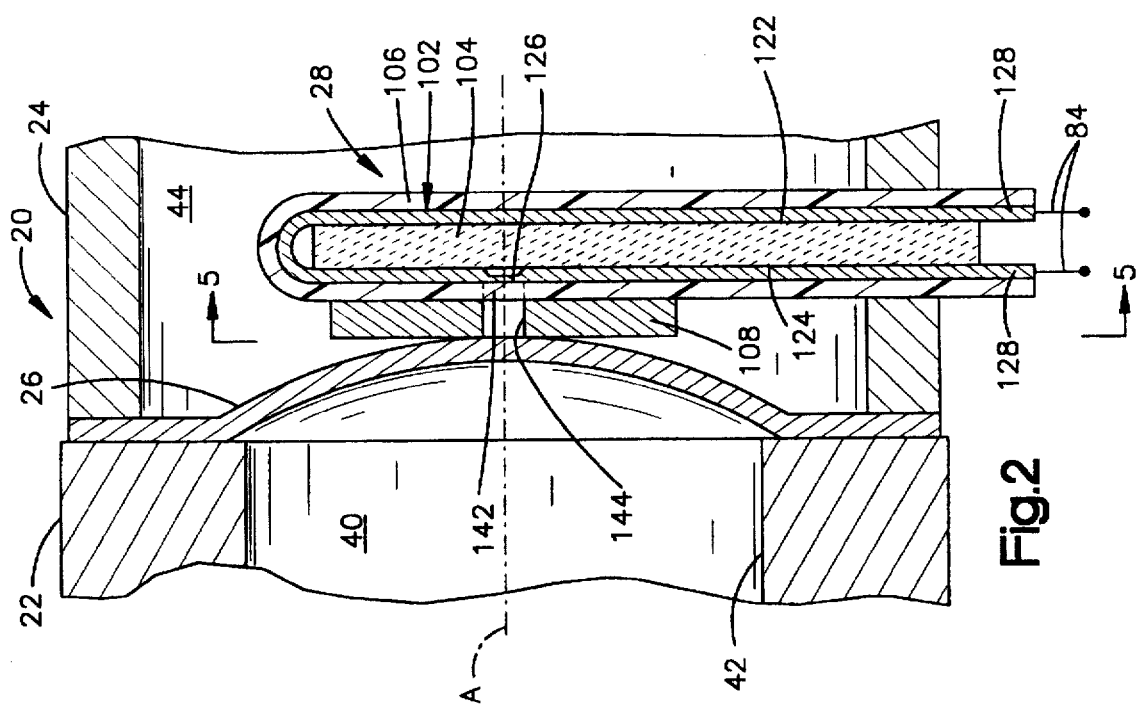

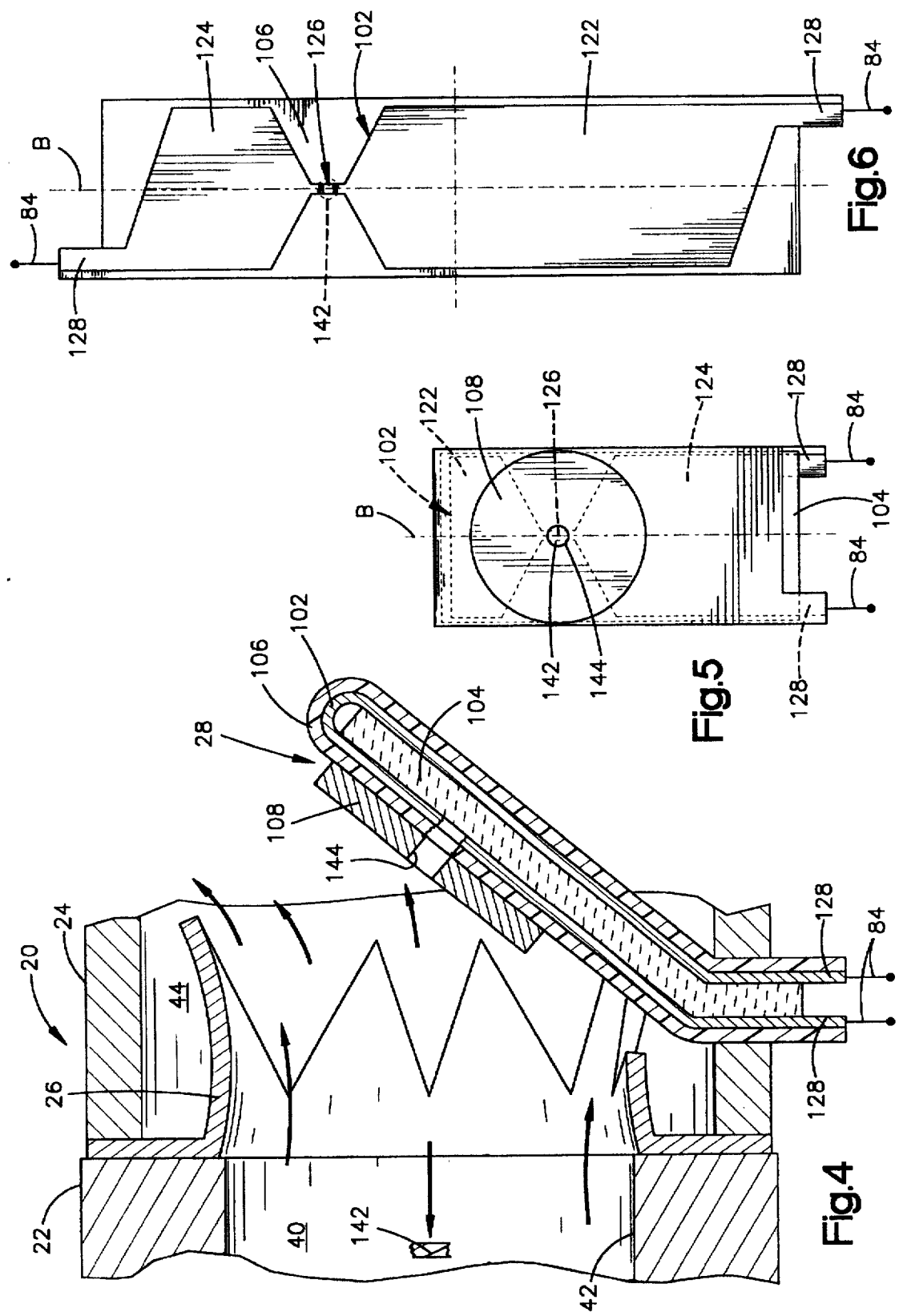

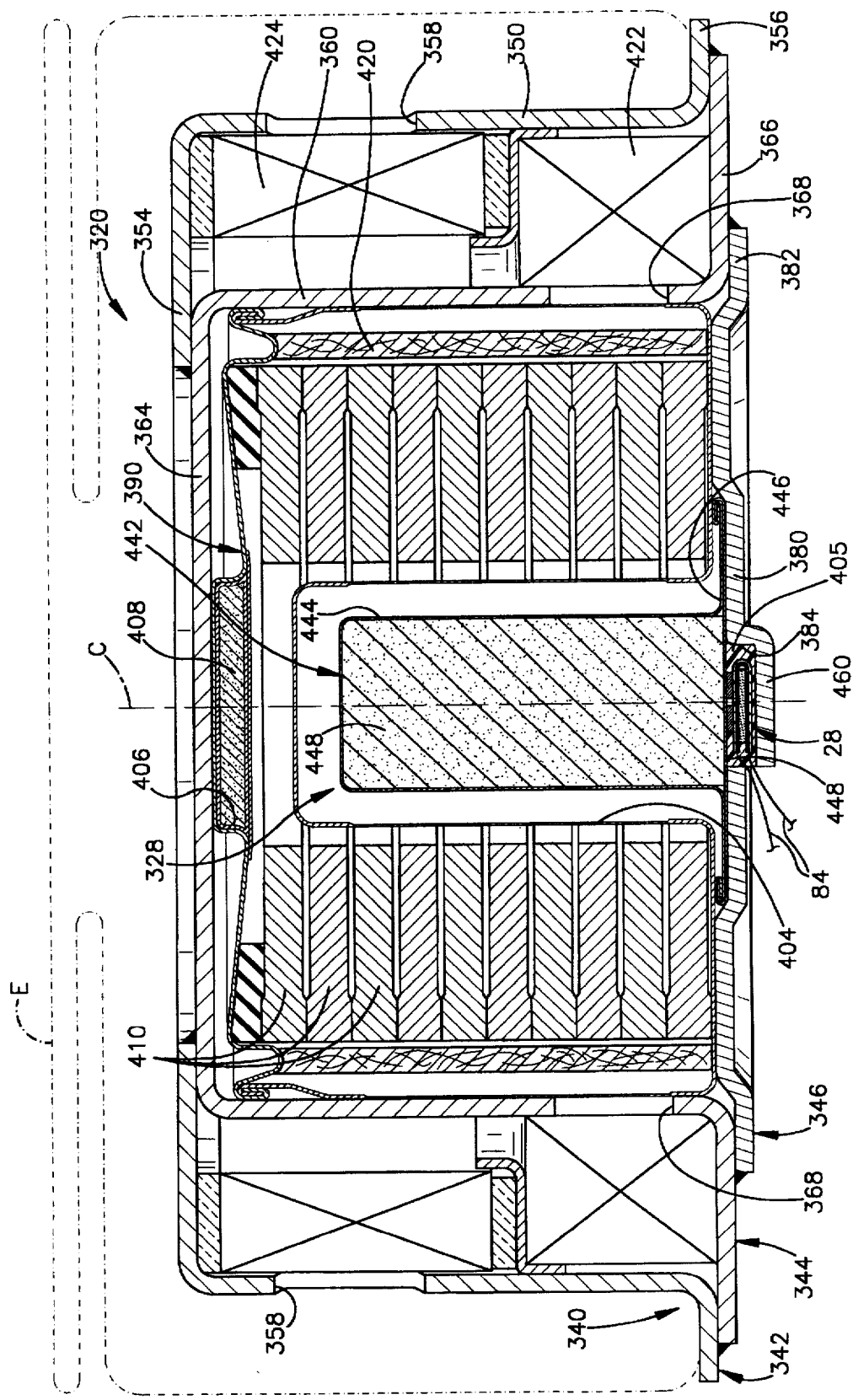

EXPLODING FOIL INITIATOR FOR AIR BAG INFLATOR

BACKGROUND OF THE INVENTION

1. Technical Field

The present invention relates to a vehicle occupant protection system. In particular, the present invention relates to an exploding foil initiator for use in an air bag inflator.

2. Description of the Prior Art

A known inflator for inflating an air bag typically includes an actuatable initiator. The initiator, upon actuation, starts the process of providing a flow of inflation fluid from the inflator to inflate the air bag.

One type of inflator includes a housing which defines an initially closed chamber for storing an inflation fluid under pressure. A rupturable closure, such as a relatively thin membrane, extends across a discharge port of the inflator housing to close the chamber. The known initiator is actuated to produce combustion products which effect opening of the chamber by rupturing the closure. Inflation fluid then flows from the inflator into the air bag.

SUMMARY OF THE INVENTION

The present invention is directed to an apparatus for protecting a vehicle occupant. The apparatus comprises an air bag having a stored deflated condition and an inflated condition for protecting the vehicle occupant. An actuatable inflator, when actuated, provides inflation fluid to flow into and inflate the air bag. Means for actuating the inflator comprises an energizeable initiator including a foil bridge section and a flyer section. The foil bridge section heats and explodes, in response to energization of the initiator, to propel the flyer section to actuate the inflator.

In one embodiment, the inflator includes a housing which defines a chamber for storing the inflation fluid under pressure. The housing has a rupturable closure which initially closes the chamber. The flyer section strikes and ruptures the closure to enable the inflation fluid to flow from the chamber and into the air bag.

In another embodiment, the initiator includes an ignitable material. When the foil bridge section heats and explodes, the flyer section is propelled to strike the ignitable material and ignite the ignitable material. The ignitable material is located adjacent the closure to rupture the closure upon ignition and allow the flow of inflation fluid from the chamber and into the air bag. The initiator is located adjacent the ignitable material on a side of the ignitable material opposite the closure.

In yet another embodiment, the inflator includes a housing which defines a chamber for storing a combustible material which, upon combustion, produces the inflation fluid for inflating the air bag. A charge of pyrotechnic material is located adjacent the combustible material. The pyrotechnic material burns in response to being struck by the flyer section to ignite the combustible material.

BRIEF DESCRIPTION OF THE DRAWINGS

Further features and advantages of the present invention will become apparent to those skilled in the art to which the present invention relates from reading the following specification with reference to the accompanying drawings, in which:

FIG. 2 is an enlarged sectional view of a portion of the inflator and of the initiator of FIG. 1;

FIG. 3 is an enlarged view of a portion of the initiator of FIG. 2 just after energization;

FIG. 4 is a view similar to FIG. 2 with parts in different positions;

FIG. 5 is a plan view of the initiator of FIG. 2, taken along the line 5—5 in FIG. 2;

FIG. 6 is a plan view of a portion of the initiator of FIG. 5 in an unfolded condition;

FIG. 8 is a schematic sectional view of another air bag inflator including another initiator assembly according to yet another embodiment of the present invention.

DESCRIPTION OF PREFERRED EMBODIMENTS

Figure 1:
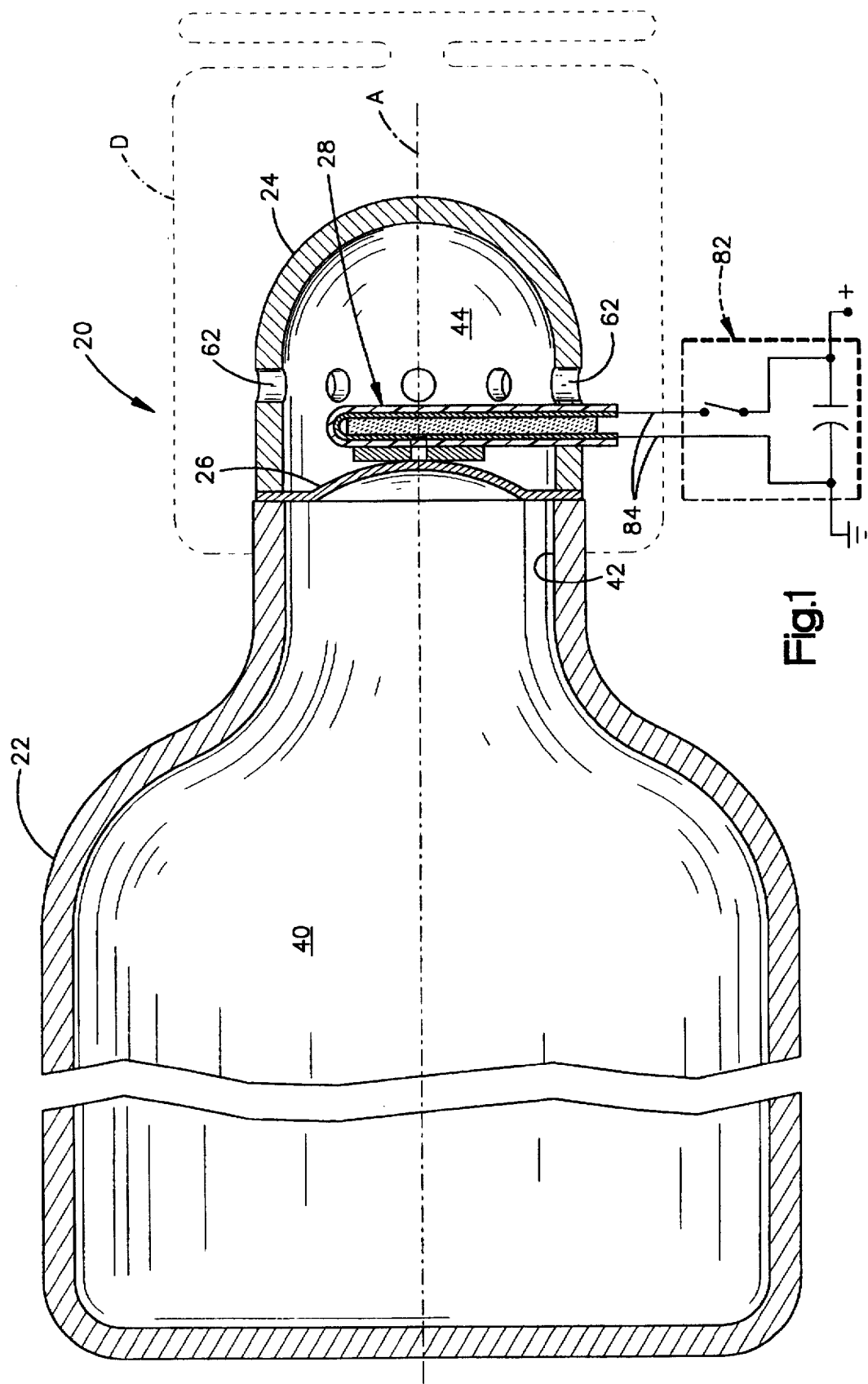
FIG. 1 is a schematic sectional view of an air bag inflator including an initiator according to one embodiment of the present invention.

An actuatable inflator 20 for inflating a vehicle air bag B is illustrated in FIG. 1. The inflator 20, upon actuation in response to a condition being detected which requires inflation of the air bag D, provides an inflation fluid to inflate the air bag.

The inflator 20 includes a housing 22, a diffuser 24, and a closure 26, which are all arranged coaxially along a central axis A of the inflator. The inflator 20 also includes an initiator 28. The housing 22 and the closure 26 cooperate to define an initially closed chamber 40 for storing the inflation fluid under pressure. The inflation fluid is preferably a substantially non-combustible inert gas, such as argon, helium, nitrogen or a combination of such gases, and is preferably stored at a pressure in the range of approximately 2,000–4,000 psi.

The housing 22 is preferably made of metal, such as an aluminum alloy or steel alloy. The housing 22 includes an opening 42 through which the inflation fluid flows when the chamber 40 is opened. The inflation fluid flows into the diffuser 24 and is directed from the diffuser to inflate the air bag. The housing 22 may be any suitable size and configuration.

Initially, the closure 26 blocks fluid flow from the chamber 40 through the opening 42 of the housing 22 to the diffuser 24. The closure 26 is rupturable to provide fluid communication between the chamber 40 and the diffuser 24 so that the inflation fluid can flow into the air bag. The closure 26 is relatively thin and is made of a metal, such as an aluminum alloy. The closure 26 may have weakened areas which rupture in a predetermined pattern.

The diffuser 24 may be of any suitable shape and size. The diffuser 24 is also made of metal, such as an aluminum alloy. As illustrated in FIG. 1, the diffuser 24 is tubular for most of its length (measured in a direction parallel to the axis A) and is closed at the right end, as viewed in FIG. 1. The diffuser 24 defines a diffuser chamber 44. The diffuser 24 has a plurality of passages or openings 62 through which the inflation fluid flows into the air bag. The size and number of openings 62 may vary, as well as the shape, location and pattern of the openings.

The initiator 28 (FIG. 2) is electrically energizable and is constructed, according to one embodiment of the present invention, to actuate the inflator 20 and open the chamber 40 to start the flow of inflation fluid from the chamber. The initiator 28 is energizable by an electrical signal of a suitable voltage and current communicated from an electrical circuit 82. The circuit 82 is electrically connected with the initiator 28 by electrical leads 84. The circuit 82 includes structure which senses when a condition requiring inflation of the air bag has occurred to generate the electrical signal which energizes the initiator 28.

The initiator 28 is relatively thin, compact and lightweight so it is suitable for use in relatively small air bag inflators. The initiator 28 is particularly advantageous where light weight and small size are important, such as in a driver side air bag inflator, in a side impact door mounted air bag inflator, or where known initiators are too large for a particular inflator application. The physical size of the initiator 28 as measured in a direction along the axis A also permits the use of a diffuser 24 having a relatively short length, measured in a direction along the axis A.

The diffuser 24 supports the initiator 28 in the diffuser chamber 44. The initiator 28 may be supported by structure which is additional to the diffuser 24 and which could extend across the diffuser. However, such additional structure would decrease the effective flow area of the opening 42 in the housing 22 and of the diffuser 24.

The initiator 28 is an exploding foil type of initiator. The initiator 28 includes a foil layer 102 (FIGS. 2, 5 and 6), an inner insulator 104, an outer insulator 106 and a barrel 108. The foil layer 102 is made from an electrically conductive material, such as copper. The foil layer 102 has a pair of sections 122, 124 (FIGS. 5 and 6) with relatively large surface areas and a bridge section 126 with a relatively small surface area. The sections 122, 124 lie on opposite sides of the bridge section 126 along a longitudinal axis B of the initiator 28. The bridge section 126 of the foil layer 102 is also thinner, as viewed in FIG. 2 and as measured in a direction along the axis A of the inflator 20, than the sections 122, 124. Projecting ends 128 on axially opposite portions of the electrically conductive foil layer 102 are connected to the leads 84.

The inner insulator 104 is made of a ceramic material. The foil layer 102 is folded over the inner insulator 104 in a U-shape, as viewed in FIG. 2, so the projecting ends 128 of the foil layer extend in the same direction. The bridge section 126 is located outward of the inner insulator 104 between the upper end and the midpoint of the axial extent of the initiator 28, measured in a direction along the axis B and as viewed in FIG. 5. Because the inner insulator 104 prevents contact between portions of the foil layer, such as the sections 122 and 124, the inner insulator electrically insulates the folded portions of the foil layer 102. The inner insulator 104 also provides a relatively rigid support structure for the parts of the initiator 28. The inner insulator 104 provides sufficient strength to resist substantial deflection prior to, during and immediately after energization of the initiator 28.

The outer insulator 106 is made from a film layer, such as KAPTON which is available from E.I. DuPont de Nemours and Company. The outer insulator 106 is located completely around the outside of the foil layer 102. The outer insulator 106 electrically insulates the exterior surface of the foil layer 102 after it is folded over the inner insulator 104. The Kapton film layer forming the outer insulator 106 has a flyer section 142 adjacent the bridge section 126 of the foil layer 102.

The barrel 108 is preferably metal and has a tubular shape that is relatively short, measured in a direction parallel to the axis A. The barrel 108 is fixed to a side surface portion of the outer insulator 106. The barrel 108 includes a central passage 144 to guide movement of the flyer section 142 in a direction substantially along the axis A. The barrel 108 is located so the passage 144 is aligned with the flyer section 142 of the outer insulator 106 and the bridge section 126 of the foil layer 102.

The initiator 28 is supported by the diffuser 24 so the central passage 144 in the barrel 108, the bridge section 126 of the foil layer 102 and the flyer section 142 of the outer insulator 106 are all located adjacent to the closure 26 along the axis A, as illustrated in FIG. 2. The flyer section 142 is readily separable from the outer insulator 106. Specifically, the barrel 108 engages and supports a relatively large area of the outer insulator 106 adjacent the bridge section 126 of the foil layer 102. The passage 144 of the barrel 108 encircles a circular area of the outer insulator 106 that can be forced to shear away from the rest of the outer insulator 106. That circular area bounded by the barrel 108 is the flyer section 142.

Electrical current flows through the relatively large sections 122, 124 of the foil layer 102 and locally heats the bridge section 126. The current flow is concentrated in the smallest cross-sectional area of the foil layer 102 defined by the bridge section 126, as measured in a plane containing the axis A (FIG. 2) of the housing 22 and extending normal to the axis B (FIG. 5) of the initiator 28. This current flow concentration increases the temperature in the bridge section 126 and vaporizes the copper in the bridge section 126 of the foil layer 102 which causes an explosion. When the bridge section 126 vaporizes, a shock wave produced by the explosion shears the flyer section 142 out of the outer insulator 106. The flyer section 142 is propelled through the passage 144 in the barrel 108, as illustrated in FIG. 3, along a desired path of travel in a direction towards the closure 26.

The flyer section 142 is guided to strike and rupture the closure 26 at a desired location, as illustrated in FIG. 4. Inflation fluid from the chamber 40 flows through the opening and into the diffuser 24. The inflation fluid is directed from the diffuser 24 and into the air bag to inflate the air bag.

The strength of the inner insulator 104 of the initiator 28 is overcome by the rush of inflation fluid flowing into the diffuser 24 through the opening 42. The initiator 28 is no longer functional, and it is free to break or bend to the right, as illustrated in FIG. 4, to minimize the restriction to the flow of inflation fluid through the opening 42 and through the diffuser 24.

Figure 7:
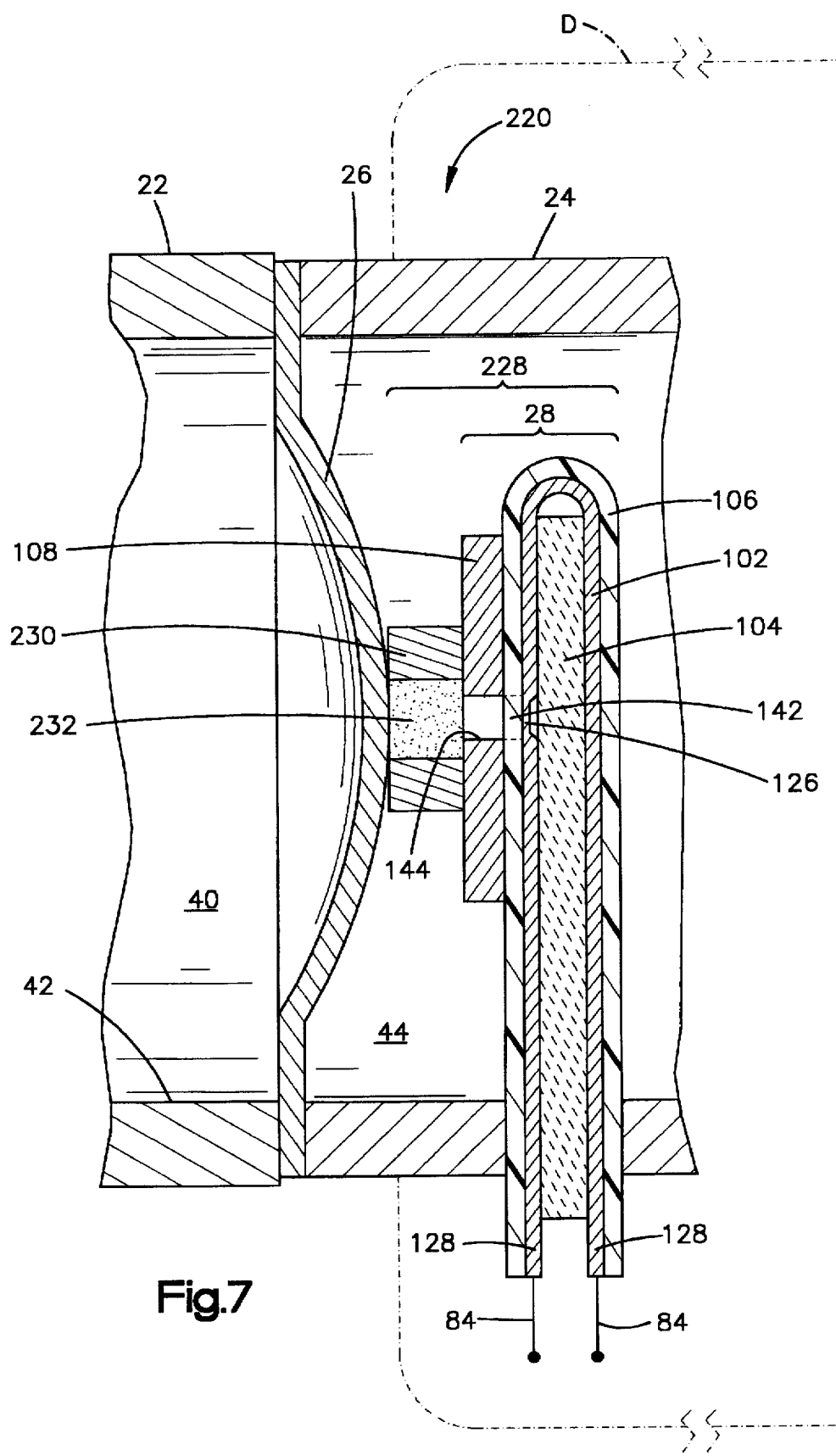
FIG. 7 is a view similar to FIG. 2 of an air bag inflator including an initiator assembly according to another embodiment of the present invention.

An alternate embodiment of the present invention is illustrated in FIG. 7. In the embodiment of FIG. 7, an initiator 228 is used in an inflator 220. The inflator 220 is similar to the inflator 20, illustrated in FIG. 1 and described above. The initiator 228 is energizable to actuate the inflator 220.

The initiator 228 includes the entire initiator 28 illustrated in FIG. 2 and described above. The initiator 228 also includes an additional member 230 located between the barrel 108 of the initiator 28 and the closure 26 of the inflator 220. The member 230 is a tubular member and contains a relatively small quantity of an ignitable material 232, such as $BKNO_3$. The member 230 is fixed to the barrel 108.

The flyer section 142 of the initiator 28 is propelled, upon energization of the initiator 228, into the ignitable material 232 in the tubular member 230. The flyer section 142 strikes the ignitable material 232 with sufficient force to ignite the ignitable material 232.

The ignitable material 232, when ignited, produces combustion products, including heat, pressure and hot particles, which are directed toward the closure 26 by the member 230. The combustion products act on the closure 26 to rupture the closure and open the chamber 40. The ruptured closure 26 permits the flow of inflation fluid from the chamber 40 into the diffuser 24, which then directs the inflation fluid into an air bag D to inflate the air bag.

Another embodiment of the present invention, is illustrated in FIG. 8. In the embodiment of FIG. 8, an inflator 320 includes an initiator 328. The inflator 320 also includes a housing 340 which is made of three pieces. The housing 340 includes a one-piece diffuser 342, a one-piece combustion cup 344, and a one-piece cover 346. The diffuser 342, the combustion cup 344, and the cover 346 are each made of metal, such as a stainless steel or an aluminum alloy.

The diffuser 342 is generally cup-shaped and has a cylindrical side wall 350 extending around a central axis C of the inflator 320. The side wall 350 extends between a flat upper annular end wall 354 and a flat lower annular flange 356. The annular flange 356 extends radially outward from a lower end portion of the cylindrical side wall 350 of the diffuser 342. The end wall 354 and the flange 356 extend substantially parallel to each other and perpendicular to the axis C. A plurality of gas outlet openings 358 are formed in a circumferential array and extend through an upper portion of the side wall 350 of the diffuser 342.

The combustion cup 344 is generally cup-shaped and is disposed coaxially inside of the diffuser 342. The combustion cup 344 has a cylindrical side wall 360 extending around the axis C. The cylindrical side wall 360 extends between an upper end wall 364 and a flat lower annular flange 366. The flange 366 extends radially outward from a lower end portion of the side wall 360. The end wall 364 and the flange 366 extend substantially parallel to each other and perpendicular to the axis C. An annular array of openings 368 extend circumferentially around a lower portion of the side wall 360.

The upper end wall 364 of the combustion cup 344 is welded to the upper end wall 354 of the diffuser cup 342, preferably by laser welding. The combustion cup flange 366 is welded to the diffuser cup flange 356, also preferably by laser welding.

The cover 346 is a generally flat circular metal piece having a center portion 380 and a parallel extending annular outer flange 382 that is axially offset from the center portion. A central opening 384 is located in the center portion 380 of the cover 346. The opening 384 is located coaxially along the axis C. The outer flange 382 of the cover 346 overlaps the combustion cup flange 366 and is welded to the combustion cup flange, preferably, by laser welding.

A hermetically sealed canister 390 is disposed in the combustion cup 344. The canister 390 is preferably made of aluminum. A recess 406 is located in the center of an upper portion of the canister 390. A packet 408 of auto ignition material is located in the recess 406.

A plurality of annular disks 410 of a combustible material are stacked within the canister 390. The disks 410 are made of a known material which, upon combustion, generates nitrogen gas for inflating the air bag. Many types of combustible material could be used to make the disks 410, such as the combustible material disclosed in U.S. Pat. No. 3,895,098.

An annular prefilter 420 is disposed in the canister 390. An annular slag screen or filter indicated schematically at 422 is located in the diffuser 342 and outside of the combustion cup 344. An annular final filter assembly indicated schematically at 424 is located inside the diffuser cup 342 above the slag screen or filter 422.

The initiator 328 includes the initiator 28, illustrated in FIG. 2 and described above. The initiator 328 also includes an initiator housing 442 which is located in a central opening defined by the annular disks 410. The initiator 328 projects through the opening 384 in the cover 346 into a central recess 404 of the canister 390. The initiator 328 is supported by the center portion 380 of the chamber cover 346, preferably with a suitable epoxy 405.

The initiator housing 442 includes a cup portion 444 with a radially extending flange 446. A cap 448 made of a relative thin aluminum is fixed to the flange 446 to close the housing 442. The cap 448 and flange 446 of the cup portion 444 are retained between the center portion 380 and the lowermost of the annular disks 410. The cup portion 444 of the housing 442 contains a quantity of an initiating charge of pyrotechnic material 448. The pyrotechnic material is preferably a mixture of equal quantities of $BKNO_3$ with $TiH_2$ and/or $KClO_4$.

The initiator 28 is supported in the opening 384 of the cover 346 by a support arm 460 of the cover. The initiator 28 is located so its flyer section 142 will be propelled substantially along the axis C. The flyer section 142 ruptures the cap 448 and strikes the pyrotechnic material 448 to ignite the pyrotechnic material. The pyrotechnic material 448 burns to produce combustion products including heat, pressure and hot particles. The combustion products rupture the upper end of the cup portion 444 and the portion of the canister 390 located within the central opening defined by the annular disks 410 of ignitable material. The combustion products contact the auto-ignition material 408 and the annular disks 410 of ignitable material to ignite both the materials and provide the inflation fluid which flows out of the inflator 320 to inflate an air bag E.

From the above description of the invention, those skilled in the art will perceive improvements, changes and modifications. Such improvements, changes and modifications within the skill of the art are intended to be covered by the appended claims.

Having described the invention, the following is claimed:

1. An inflator for inflating an air bag, said inflator comprising:

a housing defining a chamber for storing inflation fluid under pressure, said housing having an opening for the inflation fluid to flow out of said chamber;

a rupturable closure extending across said opening of said housing to initially close said chamber and block the flow of inflation fluid through said opening; and an energizable initiator located adjacent said closure and comprising a foil bridge section covered by an insulator having a flyer section, said foil bridge section heating and exploding in response to energization of said initiator causing said flyer section to be propelled into said closure thereby rupturing said closure and opening said chamber to allow the inflation fluid to flow out of said chamber through said opening to inflate the air bag.

2. The inflator of claim 1 wherein said initiator is located outside of said chamber.

3. The inflator of claim 1 wherein said initiator further includes a foil layer having an electrically conductive material, and wherein said foil bridge section comprises a portion of said foil layer.

4. The inflator of claim 3 further including a ceramic insulator which supports said foil layer.

5. The inflator of claim 1 further including a barrel located between said initiator and said closure to guide said flyer section during movement of said flyer section.

* * * * *